(12) United States Patent
Song (10) Patent No.: US 8,704,739 B2
(45) Date of Patent: *Apr. 22, 2014

(54) DISPLAY PANEL, METHOD OF DRIVING THE DISPLAY PANEL AND DISPLAY APPARATUS FOR PERFORMING THE SAME

(71) Applicant: Samsung Display Co., Ltd., Yongin (KR)

(72) Inventor: Jang-Kun Song, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,271

(22) Filed: Apr. 5, 2013

(65) Prior Publication Data

US 2013/0222218 A1    Aug. 29, 2013

Related U.S. Application Data (62) Division of application No. 12/502,134, filed on Jul. 13, 2009, now Pat. No. 8,436,845.

(30) Foreign Application Priority Data

Jan. 16, 2009  (KR) .................. 10-2009-0003711

(51) Int. Cl.
   *G09G 3/36*  (2006.01)
(52) U.S. Cl.
   USPC .................. 345/87; 345/88; 345/89

(58) Field of Classification Search
   USPC ....................................... 345/87, 214
   See application file for complete search history.

(56) References Cited

U.S. PATENT DOCUMENTS

| | | | |
|---|---|---|---|
| 7,719,504 B2 | 5/2010 | Wang et al. | |
| 2002/0033787 A1* | 3/2002 | Park et al. | 345/87 |
| 2008/0084370 A1 | 4/2008 | Wang et al. | |
| 2009/0262106 A1 | 10/2009 | Lu et al. | |

FOREIGN PATENT DOCUMENTS

| | | |
|---|---|---|
| JP | 2004062146 A | 2/2004 |
| KR | 1020060089829 A | 8/2006 |
| KR | 1020080076466 A | 8/2008 |

\* cited by examiner

*Primary Examiner* — Van Chow
(74) *Attorney, Agent, or Firm* — Cantor Colburn LLP (57) ABSTRACT

In a method of driving a display panel which includes a unit pixel including a first liquid crystal capacitor and a second liquid crystal capacitor, the first liquid crystal capacitor and the second liquid crystal capacitor are respectively charged with a high voltage and a low voltage which is less than the high voltage, during a first interval of a frame. The first liquid crystal capacitor and the second liquid crystal capacitor are both charged with a voltage between the high voltage and the low voltage, during a second interval of the frame after the first interval of the frame.

8 Claims, 7 Drawing Sheets

DISPLAY PANEL, METHOD OF DRIVING THE DISPLAY PANEL AND DISPLAY APPARATUS FOR PERFORMING THE SAME

This application is a continuation of U.S. patent application Ser. No. 12/502,134, filed on Jul. 13, 2009, which claims priority to Korean Patent Application No. 2009-3711, filed on Jan. 16, 2009, and all the benefits accruing therefrom under 35U.S.C. §119, the contents of which are herein incorporated by reference in their entirety.

BACKGROUND OF THE INVENTION

1. Field of the Invention

Exemplary embodiments of the present invention relate to a display panel, a method of driving the display panel, and a display apparatus for performing the method. More particularly, exemplary embodiments of the present invention relate to a display panel capable of improving side visibility thereof and effectively preventing blurring of a moving image, a method of driving the display panel, and a display apparatus for performing the method.

2. Description of the Related Art

A conventional display apparatus includes a display substrate having a switching element, an opposite substrate facing the display substrate, and a liquid crystal layer interposed between the display substrate and the opposite substrate.

The display apparatus displays images by applying a voltage to the liquid crystal layer and controlling the light transmittance of the liquid crystal layer. In the display apparatus, light is transmitted only in a direction in which the light is not blocked by liquid crystal molecules of the liquid crystal layer, and thus the viewing angle of the display apparatus is relatively narrow.

In order to widen the viewing angle, various technologies such as a patterned vertical alignment ("PVA") mode have been developed. A unit pixel is divided into a plurality of domains in the PVA mode.

In the PVA mode, to realize the multi-domain structure in the pixel, liquid crystal molecules are vertically aligned with respect to the display substrate and the opposite substrate. A slit pattern or a protrusion pattern is formed in a pixel electrode, or a slit pattern or a protrusion pattern is formed in a common electrode facing the pixel electrode.

In a case of the multi-domain structure in which the slit pattern or the protrusion pattern is formed, side visibility thereof is reduced in comparison with front visibility thereof.

Moreover, when the display apparatus displays moving images, blurring of the moving images may occur due to the limited frequency of a gate signal.

BRIEF SUMMARY OF THE INVENTION

Exemplary embodiments of the present invention provide a display panel capable of improving side visibility and effectively preventing blurring of moving images.

Exemplary embodiments of the present invention also provide a method of driving the above-mentioned display panel.

Exemplary embodiments of the present invention also provide a display apparatus for performing the above-mentioned method.

An exemplary embodiment of a display panel includes a common electrode, a first liquid crystal capacitor, a second liquid crystal capacitor, a dummy gate line, and a dummy switching element. A first electrode of the first liquid crystal capacitor is connected to the common electrode. A first electrode of the second liquid crystal capacitor is connected to the common electrode. The dummy gate line is extended in a first direction. The dummy switching element is electrically connected to a second electrode of the first liquid crystal capacitor, a second electrode of the second liquid crystal capacitor and the dummy gate line.

In an exemplary embodiment of the present invention, the display panel may further include a first data line extending in a second direction and disposed crossing the dummy gate line and a gate line extending in the first direction and disposed adjacent to the dummy gate line.

In an exemplary embodiment of the present invention, the display panel may further include a second data line, a first switching element and a second switching element. The second data line may be extended in the second direction and disposed adjacent to the first data line. The first switching element may be electrically connected to the first data line, the gate line and the second electrode of the first liquid crystal capacitor. The second switching element may be electrically connected to the second data line, the gate line and the second electrode of the second liquid crystal capacitor.

In an exemplary embodiment of the present invention, the display panel may further include a coupling capacitor electrically connected between the second electrode of the first liquid crystal capacitor and the second electrode of the second liquid crystal capacitor, and a first switching element electrically connected to each of the first data line, the gate line and the second electrode of the first liquid crystal capacitor.

In an exemplary embodiment of the present invention, the display panel may further include a connection gate line, a first switching element, a second switching element, a dummy switching element, an up-capacitor and a connection switching element. The connection gate line may be extended in the first direction and disposed and opposing the gate line with respect to the dummy gate line adjacent to the dummy gate line. The first switching element may be electrically connected to the first data line, the gate line and the second electrode of the first liquid crystal capacitor. The second switching element may be electrically connected to the first data line, the gate line and the second electrode of the second liquid crystal capacitor. The dummy switching element may be electrically connected to the second electrode of the first liquid crystal capacitor, the dummy gate line and the second electrode of the second liquid crystal capacitor. The up-capacitor may include a first electrode electrically connected to the second switching element. The connection switching element may be electrically connected to the second electrode of the first liquid crystal capacitor, the connection gate line and a second electrode of the up-capacitor.

An exemplary embodiment provides a method of driving a display panel. The display panel includes a first liquid crystal capacitor and a second liquid crystal capacitor. In the method, a first voltage is charged in the first liquid crystal capacitor and a second voltage which is different from the first voltage is charged in the second liquid crystal capacitor, during a first interval of a frame. A voltage between the first voltage and the second voltage is charged in the first and second liquid crystal capacitors, during a second interval of the frame after the first interval of the frame.

In an exemplary embodiment of the present invention, the display panel may further include a common electrode, a first switching element, a second switching element and a dummy switching element. The common electrode may be connected to a first electrode of the first liquid crystal capacitor and a first electrode of the second liquid crystal capacitor. The first switching element may be electrically connected to a first data line, a gate line and a second electrode of the first liquid crystal capacitor. The second switching element may be electrically connected to a second data line adjacent to the first data line, the gate line and the second electrode of the second liquid crystal capacitor. The dummy switching element is connected to a dummy gate line, the second electrode of the first liquid crystal capacitor and the second electrode of the second liquid crystal capacitor.

In an exemplary embodiment of the present invention, a gate signal may be applied to the gate line, a first data voltage corresponding to the first voltage may be applied to the first data line, and a second data voltage corresponding to the second voltage may be applied to the second data line, in the first interval of the frame.

In an exemplary embodiment of the present invention, the display panel may further include a common electrode, a first switching element, a coupling capacitor and a dummy switching element. The common electrode may be connected to a first electrode of the first liquid crystal capacitor and a first electrode of the second liquid crystal capacitor. The first switching element may be electrically connected to a first data line, a gate line and a second electrode of the first liquid crystal capacitor. The coupling capacitor may be electrically connected between the second electrode of the first liquid crystal capacitor and the second electrode of the second liquid crystal capacitor. The dummy switching element may be electrically connected to a dummy gate line, the second electrode of the first liquid crystal capacitor and the second electrode of the second liquid crystal capacitor.

In an exemplary embodiment of the present invention, a gate signal may be applied to the gate line and a first data voltage may be applied to the first data line, in the first interval of the frame.

In an exemplary embodiment of the present invention, the display panel may further include a common electrode, a first switching element, a second switching element, a dummy switching element, an up-capacitor and a connection switching element. The common electrode may be connected to a first electrode of the first liquid crystal capacitor and a first electrode of the second liquid crystal capacitor. The first switching element may be electrically connected to a first data line, a gate line and a second electrode of the first liquid crystal capacitor. The second switching element may be electrically connected to the first data line, the gate line and a second electrode of the second liquid crystal capacitor. The dummy switching element may be electrically connected to the second electrode of the first liquid crystal capacitor, a dummy gate line and the second electrode of the second liquid crystal capacitor. The up-capacitor may include a first electrode electrically connected to the second switching element. The connection switching element may be electrically connected to the second electrode of the first liquid crystal capacitor, a connection gate line and a second electrode of the up-capacitor.

In an exemplary embodiment of the present invention, a gate signal may be applied to the gate line and a first data voltage may be applied to the first data line, in the first interval of the frame.

An exemplary embodiment of a display apparatus includes a display panel and a panel driving part. The display panel includes a first liquid crystal capacitor and a second liquid crystal capacitor. The panel driving part charges a first voltage in the first liquid crystal capacitor and a second voltage different from the first voltage in the second liquid crystal capacitor, during a first interval of a frame. The panel driving part charges a voltage substantially having a level between the first voltage and the second voltage to both the first and second liquid crystal capacitors, during a second interval of the frame after the first interval of the frame.

In an exemplary embodiment of the present invention, the display panel may further include a first data line, a gate line crossing the first data line and receiving a gate signal that starts the first interval, and a dummy gate line adjacent to the gate line and receiving a dummy gate signal that starts the second interval.

In an exemplary embodiment of the present invention, the display panel may further include a common electrode connected to a first electrode of the first liquid crystal capacitor and a first electrode of the second liquid crystal capacitor, a first switching element electrically connected to the first data line, the gate line and a second electrode of the first liquid crystal capacitor, a second switching element electrically connected to a second data line adjacent to the first data line, the gate line and a second electrode of the second liquid crystal capacitor, and a dummy switching element electrically connected to the dummy gate line, the second electrode of the first liquid crystal capacitor and the second electrode of the second liquid crystal capacitor.

In an exemplary embodiment of the present invention, the display panel may further include a common electrode connected to a first electrode of the first liquid crystal capacitor and a first electrode of the second liquid crystal capacitor, a first switching element electrically connected to the first data line, the gate line and a second electrode of the first liquid crystal capacitor, a coupling capacitor electrically connected between the second electrode of the first liquid crystal capacitor and a second electrode of the second liquid crystal capacitor, and a dummy switching element electrically connected to the dummy gate line, the second electrode of the first liquid crystal capacitor and the second electrode of the second liquid crystal capacitor.

In an exemplary embodiment of the present invention, the unit pixel may further include a common electrode connected to a first electrode of the first liquid crystal capacitor and a first electrode of the second liquid crystal capacitor, a first switching element electrically connected to the first data line, the gate line and a second electrode of the first liquid crystal capacitor, a second switching element electrically connected to the first data line, the gate line and a second electrode of the second liquid crystal capacitor, a dummy switching element electrically connected to the second electrode of the first liquid crystal capacitor, the dummy gate line and the second electrode of the second liquid crystal capacitor, a up-capacitor including a first electrode electrically connected to the second switching element, and a connection switching element electrically connected to the second electrode of the first liquid crystal capacitor, a connection gate line and a second electrode of the up-capacitor.

In an exemplary embodiment of the present invention, the panel driving part may include a data driving part driving the first data line, a gate driving part driving the gate line and a dummy gate driving part driving the dummy gate line.

In an exemplary embodiment of the present invention, the voltage between the first voltage and the second voltage may be substantially closer to the second voltage than the first voltage. Alternatively, the first voltage may be about 4 V to about 6 V, the second voltage may be about 0.25 V to about 0.75 V, and the voltage between the first voltage and the second voltage may be about 1.5 V to about 2.5 V.

An exemplary embodiment provides a voltage between a high voltage and a low voltage may be charged in a spatially divided pixel by disposing a dummy gate line on the spatially divided pixel. Advantageously, the side visibility of the display apparatus may be improved and blurring of moving images may be effectively prevented.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. The term "connected" may be used to refer to physical and/or electrical connection. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Exemplary Embodiment 1

Figure 1:
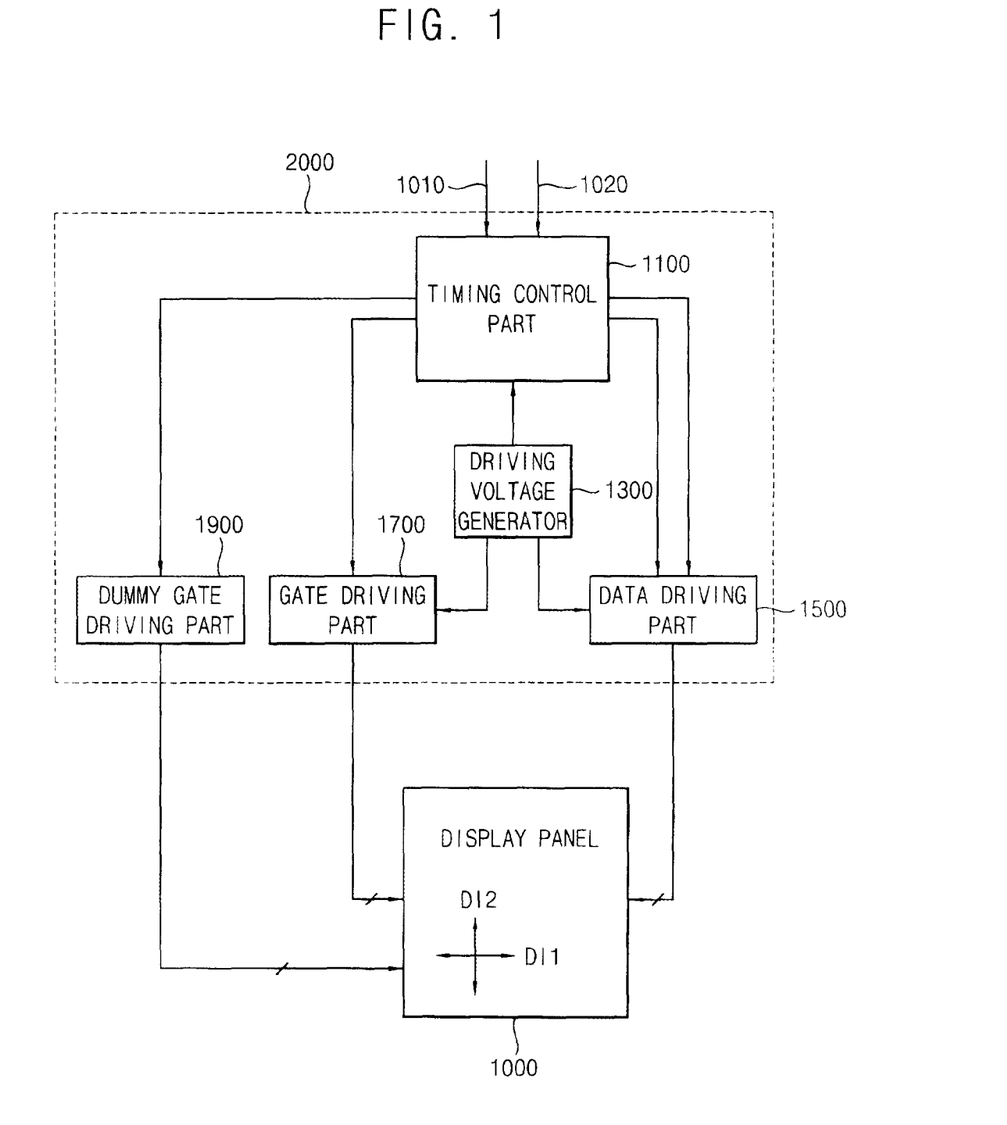
FIG. 1 is a block diagram illustrating a display apparatus according to Embodiment 1 of the present invention.
Figure 2:
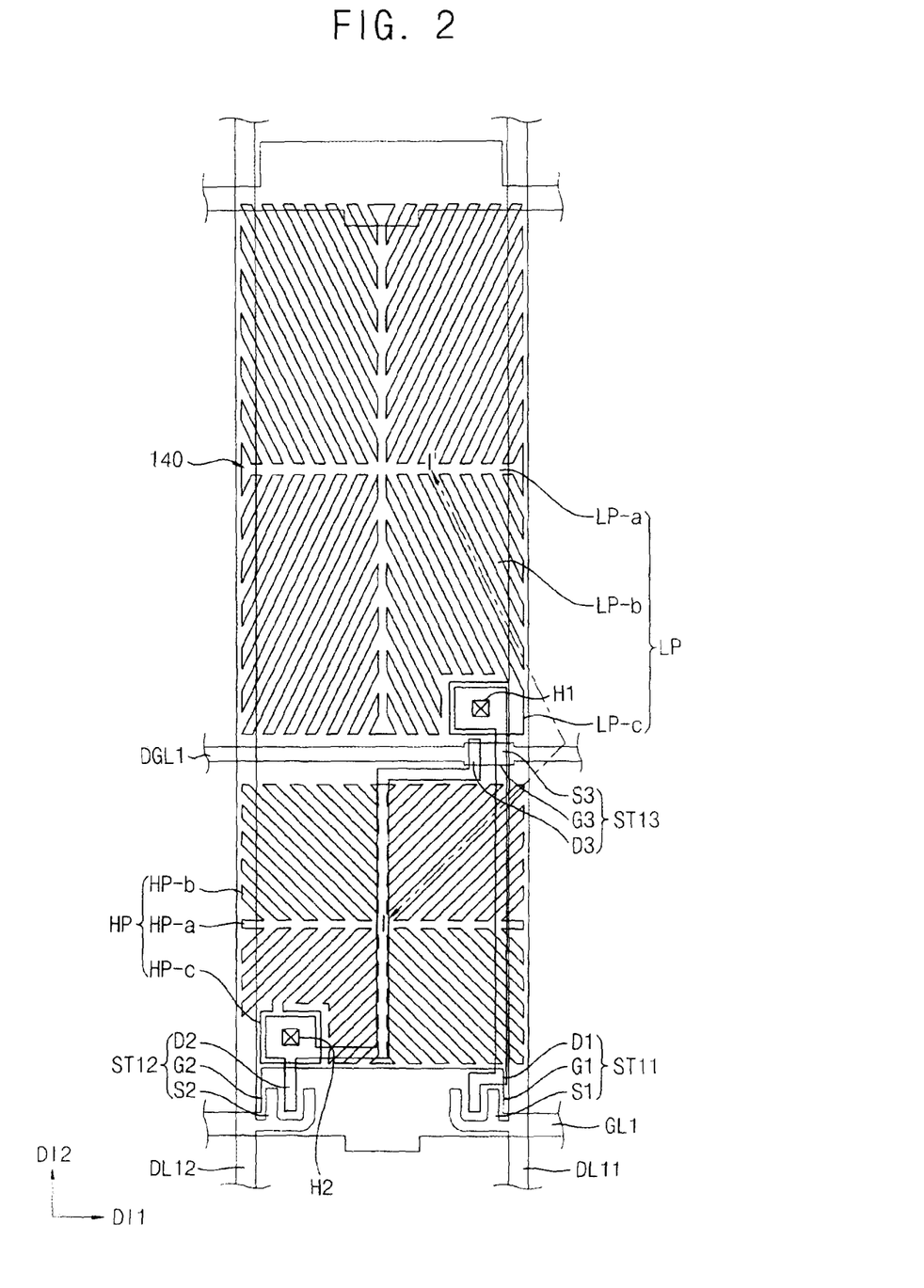
FIG. 2 is a plan view illustrating an exemplary embodiment of a display panel of FIG. 1.
Figure 3:
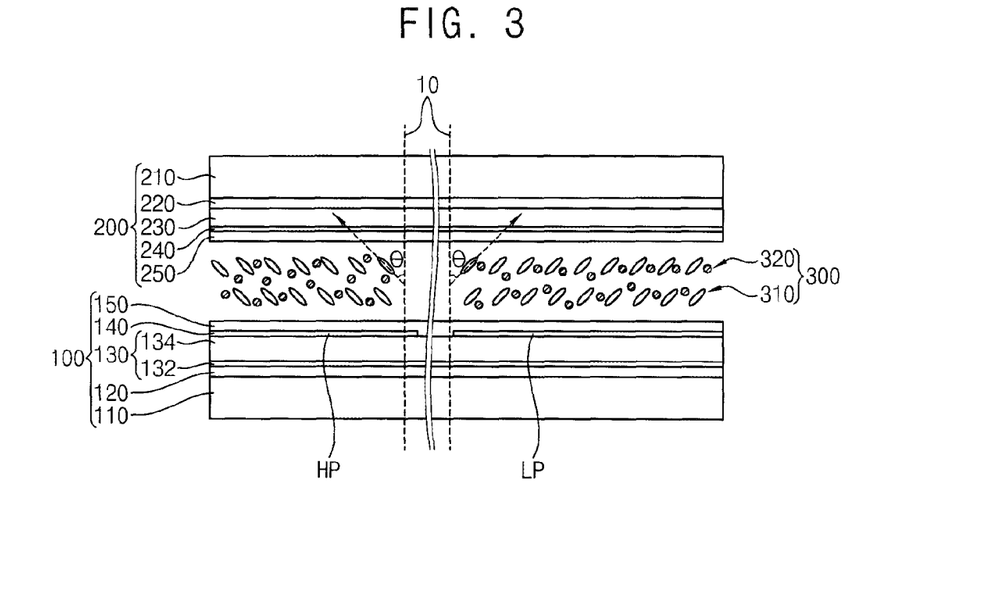
FIG. 3 is a cross-sectional view taken along line I-I' of FIG. 2.

FIG. 1 is a block diagram illustrating a display apparatus according to Embodiment 1 of the present invention. FIG. 2 is a plan view illustrating a display panel of FIG. 1. FIG. 3 is a cross-sectional view taken along line I-I' of FIG. 2.

Referring to FIGS. 1 to 3, the display apparatus includes a display panel 1000 and a driving apparatus 2000 which drives the display panel 1000.

The display panel 1000 includes an array substrate 100, an opposite substrate 200 facing the array substrate 100 and a liquid crystal layer 300 interposed between the array substrate 100 and the opposite substrate 200.

The array substrate 100 includes a first transparent substrate 110, a plurality of gate lines GL 1, a plurality of dummy gate lines DGL 1, a gate insulation layer 120, a plurality of first data lines DL11, a plurality of second data lines DL12, a plurality of first switching elements ST11, a plurality of a second switching elements ST12, a plurality of dummy switching elements ST13, a protective layer 130, a plurality of pixel electrodes 140 and a first alignment layer 150.

Referring to FIG. 2, the gate line GL1 is disposed longitudinally extended on the first transparent substrate 110 in a first direction DI1. The gate insulation layer 120 is disposed on the first transparent substrate 110 to cover the gate line GL1, such that the gate insulation layer 120 overlaps substantially an entire of the first transparent substrate 110.

The dummy gate line DGL1 is disposed longitudinally extended on the first transparent substrate 110 in the first direction DI1, and substantially parallel to the gate line GL1. The gate insulation layer 120 is disposed on the first transparent substrate 110 to cover the dummy gate line DGL1.

The first and second data lines DL11 and DL12 are disposed longitudinally extended on the gate insulation layer 120 in a second direction DI2 crossing (e.g., intersecting at an incline) the first direction DI1. The first direction DI1 may be disposed substantially perpendicular to the second direction DI2. The first data line DL1 may be disposed adjacent to the second data line DL2. A first data voltage may be applied to the first data line DL11, and a second data voltage higher than the first data voltage may be applied to the second data line DL12.

The first switching element ST11 may include a first gate electrode G1, a first active pattern (not shown), a first source electrode S1 and a first drain electrode D1. The first gate electrode G1 is protruded in the second direction DI2 from a main portion of the gate line GL1. The first gate electrode G1 is disposed continuous with the gate line GL1, such that the first gate electrode G1 and the gate line GL1 are a unitary indivisible element of the display panel. The first active pattern is disposed on the gate insulation layer 120 corresponding to the first gate electrode G1. As used herein, "corresponding" may refer to as being related in positional relationship, dimension and/or shape to another element, such as being aligned with the another element. The first source electrode S1 is protruded from a main portion of the first data line DL11 to overlap with the first active pattern. The first source electrode S1 is disposed continuous with the first data line DL11, such that the first source electrode S1 and the first data line DL11 are a unitary indivisible element of the display panel. In the plan view, the first drain electrode D1 is spaced apart from the first source electrode S1 and overlaps with the first active pattern.

The second switching element ST12 may include a second gate electrode G2, a second active pattern (not shown), a second source electrode S2 and a second drain electrode D2. The second gate electrode G2 is protruded in the second direction DI2 from the main portion of the gate line GL1. The second gate electrode G2 is disposed continuous with the gate line GL1 and the first gate electrode G1, such that the second gate electrode G2, the first gate electrode G1 and the gate line GL1 are a unitary indivisible element of the display panel. The second active pattern is disposed on the gate insulation layer 120 corresponding to the second gate electrode G2. The second source electrode S2 is protruded from a main portion of the second data line DL12 to overlap with the second active pattern. The second source electrode S2 is disposed continuous with the second data line DL12, such that the second source electrode S2 and the second data line DL 12 are a unitary indivisible element of the display panel. In the plan view, the second drain electrode D2 is spaced apart from the second source electrode S2 to overlap with the second active pattern. In the illustrated exemplary embodiment, the first and second gate electrodes G1 and G2 may be integrally formed with each other, such as to form a unitary indivisible element with the gate line GL 1.

The dummy switching element ST13 may include a third gate electrode G3, a third active pattern (not shown), a third source electrode S3 and a third drain electrode D3. The third gate electrode G3 is protruded from a main portion of the dummy gate line DGL1, such as in both the first and second directions DI1 and DI2. The third active pattern is disposed on the gate insulation layer 120 corresponding to the third gate electrode G3.

The third source electrode S3 is extended from the first drain electrode D1 of the first switching element ST11. The third source electrode S3 is disposed continuous with the first drain electrode D1, such that the third source electrode S3 and the first drain electrode D1 are a unitary indivisible element of the display panel. In the plan view of FIG. 2, a portion of the first drain electrode D1 (the portion as the third source electrode S3) overlaps a portion of the dummy gate line DGL1.

The third drain electrode D3 is extended from the second drain electrode D2 of the second switching element ST12. The third drain electrode D3 is disposed continuous with the second drain electrode D2, such that the third drain electrode D3 and the second drain electrode D2 are a unitary indivisible element of the display panel. In the plan view of FIG. 2, a portion of the second drain electrode D2 (the portion as the third drain electrode D3) overlaps a portion of the dummy gate line DGL1. The third drain electrode D3 is spaced apart from the third source electrode S3 to overlap with the third active pattern.

A whole of the first drain electrode D1, the second drain electrode D2, the third drain electrode D3 and the third source electrode S3 is disposed between the adjacent first and second data lines DL11 and DL12. In the plan view of FIG. 2, a portion of both the first drain electrode D1 and the second drain electrode D2 overlaps a portion of the single gate line GL1.

Referring again to FIG. 3, the protective layer 130 is disposed on the gate insulation layer 120 to cover and overlap the first and second data lines DL11 and DL12, the first and second switching elements ST11 and ST12, and the dummy switching element ST13. The protective layer 130 may include an inorganic insulation layer 132 and an organic insulation layer disposed on the inorganic insulation layer 132. The inorganic insulation layer 132 is disposed on the gate insulation layer 120 to cover and overlap the first and second data lines DL11 and DL12, the first and second switching elements ST11 and ST12, and the dummy switching element ST13.

The pixel electrode 140 is disposed on the protective layer 130. The pixel electrode 140 may include an optically transparent and/or electrically conductive material. Referring to the plan view of FIG. 2, the pixel electrode 140 includes a lower pixel electrode LP electrically connected to the first drain electrode D1 of the first switching element ST11, and an upper pixel electrode HP spaced apart from the lower pixel electrode and electrically connected to the second drain electrode D2 of the second switching element ST12. In the plan view, the lower pixel electrode LP may have a larger size (e.g., areal dimension) than that of the upper pixel electrode HP. An area of the lower and upper pixel electrodes LP and HP may be defined by outer boundaries thereof.

The pixel electrode 140 including the lower and upper pixel electrodes LP and HP, may include a plurality of a micro-slit pattern formed therein.

In the illustrated exemplary embodiment, the lower pixel electrode LP may include a lower stem portion LP-a having a substantially cross shape, a lower branch portion LP-b having a substantially radial shape protruded from the lower stem portion LP-a, and a lower contact portion LP-c physically and electrically connected to the lower stem portion LP-a and/or the lower branch portion LP-b to be overlapped with the first drain electrode D1 of the first switching element ST11. The lower stem portion LP-a, the lower branch portion LP-b and the lower contact portion LP-c are disposed continuous with each other, such that the lower stem portion LP-a, the lower branch portion LP-b and the lower contact portion LP-c collectively form a unitary indivisible lower pixel electrode LP of the display panel. The lower contact portion LP-c electrically and physically contacts the first drain electrode D1 of the first switching element ST11 through a first contact hole H1 which is an area in which the first drain electrode is exposed without the protective layer 130 thereon.

Since a portion of the lower pixel electrode LP physically and electrically contacts the first drain electrode D1 of the first switching element ST11, the first data voltage (applied to the first data line DL11) may be advantageously applied to the lower pixel electrode LP through the first drain electrode D1 of the first switching element ST11, based on a gate signal applied to the gate line GL1.

The upper pixel electrode HP may include an upper stem portion HP-a having substantially a cross shape, an upper branch portion HP-b having substantially a radial shape protruded from the upper stem portion HP-a, and an upper contact portion HP-c physically and electrically connected to the upper stem portion HP-a and/or the upper branch portion HP-b to be overlapped with the second drain electrode D2 of the second switching element ST12. The upper stem portion HP-a, the upper branch portion HP-b and the upper contact portion HP-c are disposed continuous with each other, such that the upper stem portion HP-a, the upper branch portion HP-b and the upper contact portion HP-c collectively form a unitary indivisible upper pixel electrode HP of the display panel. The upper contact portion HP-c electrically and physically contacts the second drain electrode D2 of the second switching element ST12 through a second contact hole H2 which is an area in which the first drain electrode is exposed without the protective layer 130 threreon.

Since a portion of the upper pixel electrode HP contacts the second drain electrode D2 of the second switching element ST12, the second data voltage (applied to the second data line DL12) may be advantageously applied to the upper pixel electrode HP through the second drain electrode D2 of the second switching element ST12, based on the gate signal applied to the gate line GL1.

In the plan view of the illustrated exemplary embodiment, the dummy gate line DGL1 is disposed between the lower pixel electrode LP and the upper pixel electrode HP. With the dummy gate line DGL1 of the illustrated embodiment, a first voltage of the lower pixel electrode LP rises and a second voltage of the upper pixel electrode HP falls based on a dummy gate signal DGS from the dummy gate line DGL1, so that the first voltage and the second voltage are substantially equal. In an exemplary embodiment, a portion of the lower pixel electrode LP and the a portion of the upper pixel electrode HP may overlap with the dummy gate line DGL1.

In an exemplary embodiment, the array substrate 100 may further include a dummy transparent electrode (not shown) overlapping the dummy gate line DGL1.

Referring again to FIG. 3, the first alignment layer 150 is disposed on the protective layer 130 and overlapping the pixel electrode 140. The first alignment layer 150 may directly contact both the pixel electrode 140 and the protective layer 130. The first alignment layer 150 may be disposed overlapping substantially an entire of the first transparent substrate 110.

The opposite substrate 200 may include a second transparent substrate 210, a color filter 220, a planarization layer 230, a common electrode 240 and a second alignment layer 250. In an exemplary embodiment, the planarization layer 230 may be omittable.

The color filter 220 is disposed on the second transparent substrate 210 facing the array substrate 100. The planarization layer 230 is disposed on the color filter 220 to planarize a surface of the color filter 220. The common electrode 240 may include an optically transparent and/or electrically conductive material. The common electrode 240 is disposed on the planarization layer 230. The second alignment layer 250 is disposed directly on the common electrode 240. In an exemplary embodiment, the color filter 220 may be disposed on the array substrate 100 and the common electrode may be disposed on the opposite substrate 200. In an exemplary embodiment, the color filter 220 may be disposed on the opposite substrate 200 and the common electrode may be disposed on the array substrate 100. In an exemplary embodiment, both of the color filter 220 and the common electrode may be disposed on the array substrate 100.

The liquid crystal layer 300 is interposed between the array and opposite substrates 100 and 200. The liquid crystal layer 300 includes a plurality of a liquid crystal molecule 310 and a plurality of an ultraviolet ("UV")-curable particle 320. In an exemplary embodiment, the liquid crystal layer 300 may further include a plurality of photoinitiator molecules (not shown).

The liquid crystal molecules 310 are rearranged by an electric field formed between the pixel electrode 140 and the common electrode 240 of the display panel, to control light transmittance.

The UV-curable particles 320 are interposed between the liquid crystal molecules 310 to be cured by light. Referring to FIG. 3, the UV-curable particles 320 may pretilt the liquid crystal molecules 310 at a predetermined angle 'θ' with respect to a perpendicular direction 10 (indicated by dotted lines). The perpendicular direction 10 is substantially perpendicular to a surface of the first and second substrates 100 and 200, and may be substantially orthogonal to both the first and second directions DI1 and DI2. In the illustrated exemplary embodiment, the pretilt angles 'θ' of the liquid crystal molecules 310, which are pretilted as directly affected by the UV-curable particles 320, may be substantially equal to each other with respect to the lower and upper pixel electrodes LP and HP.

In an exemplary embodiment, each of the UV-curable particles 320 may include acryl, methacryl, dienyl, vinyl, etc.

The liquid crystal layer 300 may further include photoinitiator molecules (not shown) that help to initiate curing of the UV-curable particles 320.

Referring again to FIG. 1, the driving apparatus 2000 includes a timing control part 1100, a driving voltage generating part 1300, a data driving part 1500, a gate driving part 1700 and a dummy gate driving part 1900.

The timing control part 1100 receives a synchronizing signal 1010 and data 1020 from outside (e.g., external to the driving apparatus 2000). The synchronizing signal 1010 may include, but is not limited to, a horizontal synchronizing signal, a vertical synchronizing signal and/or a data enable ("DE") signal synchronized with the horizontal synchronizing signal. The data 1020 may include, but is not limited to, red data, green data and/or blue data. Each of the red data, the green data and/or the blue data correspond to the pixel electrode 140.

The timing control part 1100 generates a gate control signal and a data control signal which control driving a timing of the driving apparatus 2000, by using the synchronizing signal 1010. The timing control part 1100 includes a storage part (not shown) storing the data 1020.

The timing control part 1100 processes data corresponding to pixel structures of the display panel 1000, through a data processing method for processing data storage capacity and enhancing data processing reliability.

The timing control part 1100 divides M unit pixels of a plurality of unit pixels into color data so that some color data is processed at once (e.g., at substantially the same time) in the unit pixel row by using the received DE signal (M is a natural number greater than or equal to 2). The unit pixels correspond to the plurality of pixel electrodes 140, respectively. In the illustrated embodiment, the DE signal includes a pulse corresponding to a 1 horizontal period H, and a blank disposed between the pulses. The width of the blank may be variable. The data of the unit pixel row includes red, green and blue data as the unit pixel includes red, green and blue pixels.

The driving voltage generating part 1300 generates a driving voltage for driving a display apparatus using a power voltage received from an external device (not shown). In one exemplary embodiment, the driving voltage generating part 1300 may supply a digital power voltage DVDD and an analog power voltage AVDD to the data driving part 1500. The driving voltage generating part 1300 may supply a gate-on voltage VON and a gate-off voltage VOFF.

The data driving part 1500 is synchronized with the data control signal received from the timing control part 1100. The data driving part 1500 converts the data into a data voltage of an analog type and outputs the data voltage to the data lines on the display panel 1000.

In a plan view of an exemplary embodiment, the data driving part 1500 may be disposed at a side edge of the display panel 1000 and longitudinally extended in a direction substantially parallel with the second direction DI2, according to the pixel structure of display panel 1000 in FIG. 2.

The gate driving part 1700 is synchronized with the gate control signal received from the timing control part 1100. The gate driving part 1700 sequentially outputs a gate signal including the gate-on voltage VON and the gate-off voltage VOFF to the gate lines.

In a plan view of an exemplary embodiment, the gate driving part 1700 may be disposed at a side edge of the display panel 1000 and longitudinally extended in a direction substantially parallel with the first direction DI1 according to the pixel structure of display panel 1000 of FIG. 2.

The dummy gate driving part 1900 is synchronized with a dummy gate control signal from the timing control part 1100 so that the dummy gate driving part 1900 sequentially outputs dummy gate signals to the dummy gate lines DGL1.

In a plan view of an exemplary embodiment, the dummy gate driving part 1900 may be disposed at the side edge of the display panel 1000 and longitudinally extended in the direction substantially parallel with the first direction DI1 according to the pixel structures of display panel 1000 of FIG. 2.

In a plan view of an exemplary embodiment, the gate lines GL1 and the dummy gate line DGL1 may be alternately disposed at the side edge of the display panel 1000.

Additionally, the gate driving part 1700 driving the gate lines GL1 may be mounted on a gate driving circuit chip, and the dummy gate driving part 1900 driving the dummy gate lines DGL1 may be mounted on a dummy gate driving circuit chip.

In a plan view of an exemplary embodiment, the gate driving circuit chip and the dummy gate driving circuit chip may be disposed at two of opposing sides of the display panel 1000.

Figure 4:
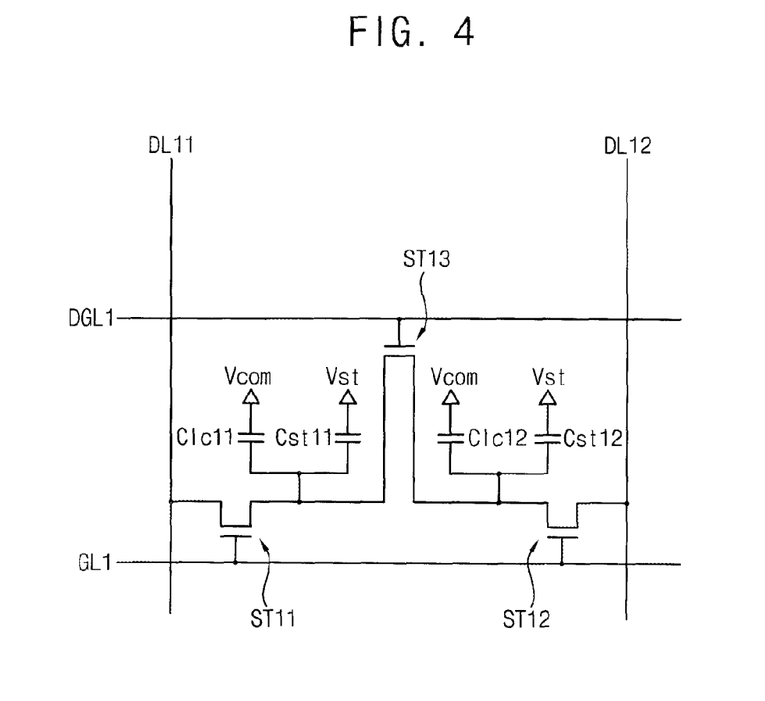
FIG. 4 is an exemplary embodiment of an equivalent circuit diagram illustrating a display panel of FIG. 1.

FIG. 4 is an equivalent circuit diagram illustrating the display panel of FIG. 1

Referring to FIGS. 2 and 4, the first switching element ST11 is electrically connected to the lower pixel electrode LP. A portion of the lower pixel electrode LP contacts the first drain electrode D1 of the first switching element ST11. When a gate signal is applied to the gate line GL1, the first data voltage transmitted to the first data line DL11 is applied to the lower pixel electrode LP.

Moreover, the second switching element ST12 is electrically connected to the upper pixel electrode HP. A portion of the upper pixel electrode HP contacts the second drain electrode D2 of the second switching element ST12. When the gate signal is applied to the gate line GL1, the second data voltage transmitted to the second data line DL12 is applied to the upper pixel electrode HP.

In one exemplary embodiment, and with reference to FIG. 4, the first gate electrode G1 of the first switching element ST11 may be electrically connected to the gate line GL1. The first source electrode 51 of the first switching element ST11 may be electrically connected to the first data line DL11 based on the gate signal. The first drain electrode D1 of the first switching element ST11 may be electrically connected to a first electrode of a first liquid crystal capacitor Clc11 and a first electrode of a first storage capacitor Cst11.

The second gate electrode G2 of the second switching element ST12 is electrically connected to the gate line GL1. The second source electrode S2 of the second switching element ST12 is electrically connected to the second data line DL12 based on the gate signal. The second drain electrode D2 of the second switching element ST12 is electrically connected to a first electrode of a second liquid crystal capacitor Clc12 and a first electrode of a second storage capacitor Cst12.

The first electrode of the first liquid crystal capacitor Clc11 and the first electrode of the first storage capacitor Cst11 are essentially the lower pixel electrodes LP. A second electrode of the first liquid crystal capacitor Clc11 is connected to the common electrode 240 to receive a common voltage Vcom, and a second electrode of the first storage capacitor Cst11 is connected to a storage line (not shown) to receive a storage voltage Vst.

The first electrode of the second liquid crystal capacitor Clc12 and the first electrode of the second storage capacitor Cst12 are essentially the upper pixel electrodes HP. A second electrode of the second liquid crystal capacitor Clc12 is connected to the common electrode 240 to receive the common voltage Vcom, and a second electrode of the second storage capacitor Cst12 is connected to the storage line (not shown) to receive the storage voltage Vst.

The dummy switching element ST13 is electrically connected to the lower pixel electrode LP and the upper pixel electrode HP. When the dummy gate signal is applied to the dummy gate line DGL1, the lower pixel electrode LP and the upper pixel electrode HP are electrically connected so that the first voltage of the lower pixel electrode LP and the second voltage of the upper pixel electrode HP become substantially the same.

Figure 5:
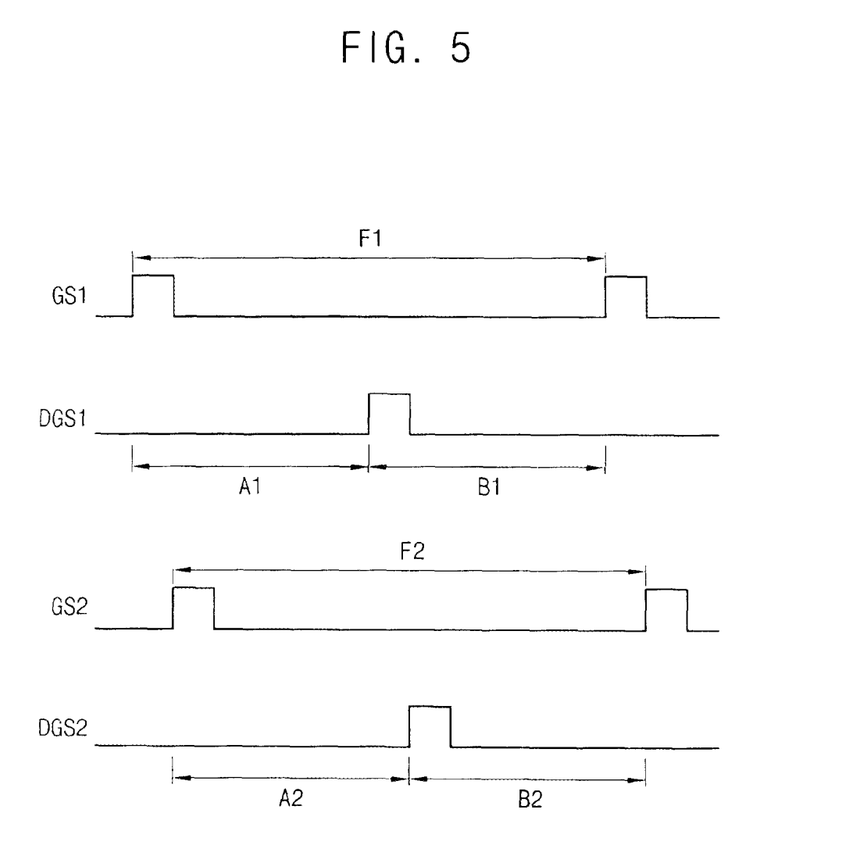
FIG. 5 is a waveform diagram showing an exemplary embodiment of signals provided to a gate line and a dummy gate line in FIG. 3.
Figure 6:
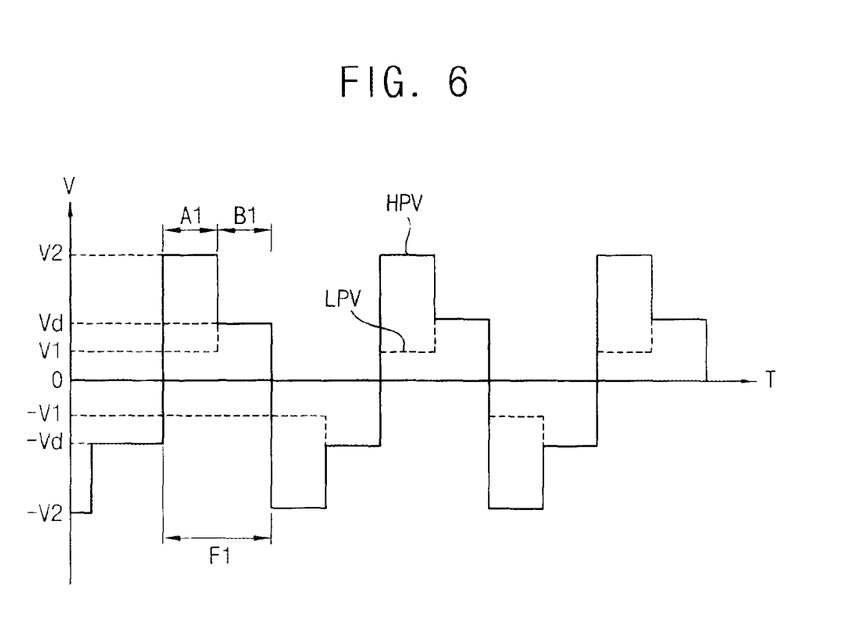
FIG. 6 is a waveform diagram showing an exemplary embodiment of voltages charged in a first liquid crystal capacitor and a second liquid crystal capacitor of FIG. 3.

FIG. 5 is a waveform diagram showing an exemplary embodiment of signals provided to a gate line and a dummy gate line in FIGS. 2 and 3. FIG. 6 is a waveform diagram showing an exemplary embodiment of voltages charged in a first liquid crystal capacitor and a second liquid crystal capacitor of FIGS. 2 and 3.

Referring to FIGS. 2, 5 and 6, a horizontal axis (x-axis) represents time T, and a vertical axis (y-axis) represents voltage V. During a first frame interval F1 in which a first gate signal GS1 is applied to the gate line GL1, the lower pixel electrode LP (e.g., the first electrode of the first liquid crystal capacitor Clc11 and the first electrode of the first storage capacitor Cst11) is charged with a first data voltage V1, and the upper pixel electrode HP (e.g., the first electrode of the second liquid crystal capacitor Clc12 and the first electrode of the second storage capacitor Cst12) is charged with a second data voltage V2. A voltage which is charged in the first liquid crystal capacitor Clc11 represents a low pixel voltage LPV, and a voltage which is charged in the second liquid crystal capacitor Clc12 represents a high pixel voltage HPV.

In the illustrated exemplary embodiment, the gate signal applied to the gate line GL1 may be operated at a frequency of 120 Hz. Thus, the display apparatus may display images corresponding to the first frame for $1/120$ seconds.

The first frame interval F1 in FIG. 6 represents $1/120$ seconds. The dummy gate line DGL1 is separately driven from the gate line GL1. In one exemplary embodiment, a first dummy gate signal DGS1 may be applied to the array substrate 100 $1/2$F1 after driving gate line GL1.

In FIGS. 5 and 6, the first frame interval F1 starts when the gate line GL1 receives the first gate signal GS1. The first data voltage V1 having a low voltage and the second data voltage V2 having a high voltage are respectively charged in the lower pixel electrode LP and the upper pixel electrode HP during a first interval A1 of the first frame interval F1. When the dummy switching element ST13 is turned on by the first dummy gate signal DGS1 applied to the dummy gate line DGL1, the lower pixel electrode LP and the upper pixel electrode are electrically connected. Thus, the low pixel voltage LPV and the high pixel voltage HPV are substantially equal to each other during a second interval B1 of the first frame interval F1.

In the illustrated exemplary embodiment, the first interval A1 may be about $1/4$ to about $3/4$ of the first frame interval F1.

The lower pixel electrode LP and the upper pixel electrode HP may be charged with positive voltages during the first frame interval F1. Alternatively, the lower pixel electrode LP and the upper pixel electrode HP may be charged with negative voltages during a second frame interval F2 because the display apparatus may use a frame inversion driving method.

Referring again to FIGS. 5 and 6, the second frame interval F2 may start when the gate line GL1 receives a second gate signal GS2. A negative low voltage and a negative high voltage are respectively charged in the lower pixel electrode LP and the upper pixel electrode HP during a first interval A2 of the second frame interval F2. When the dummy switching element ST13 is turned on by a second dummy gate signal DGS2 applied to the dummy gate line DGL1, the lower pixel electrode LP and the upper pixel electrode are electrically connected. The dummy gate signal turns on the dummy switching element ST13 so that the lower pixel electrode LP and the upper pixel electrode HP are electrically connected and share electric charges. Accordingly, the low pixel voltage LPV rises and the high pixel voltage HPV falls. That is, a voltage Vb between the lower pixel electrode LP and the upper pixel electrode HP is applied to the lower pixel electrode LP and the upper pixel electrode HP.

The voltage Vb applied to the lower pixel electrode LP and the upper pixel electrode HP may be defined by the following Equation 1.

Equation 1

$$Vb = \frac{VlCl + VhCh}{Cl + Ch} \qquad \text{Equation 1}$$

In this case, the reference symbol 'Vl' and the reference symbol 'Vh' denote the low pixel voltage LPV and the high pixel voltage HPV, respectively. The reference symbol 'Cl' denotes a first total capacitance having a first storage capacitance formed in correspondence with the lower pixel electrode LP and a liquid crystal capacitance defined by the lower pixel electrode LP, the common electrode 240 and the liquid crystal layer interposed between the lower pixel electrode LP and the common electrode 240. Moreover, the reference symbol 'Ch' denotes a second total capacitance having a liquid crystal capacitance defined by the upper pixel electrode HP, the common electrode 240 and the liquid crystal layer interposed between the lower pixel electrode LP and the common electrode 240.

Since the first total capacitance Cl is greater than no less than two times the second total capacitance Ch, it can be seen that the voltage Vb is closer to the first data voltage V1 than the second data voltage V2. Moreover, it can be seen that a variation range of the high pixel electrode voltage HPV is greater than a variation range of the low pixel electrode voltage LPV.

In the first interval A1, the second data voltage V2 may be about 4 V to about 6 V, and the first data voltage V1 may be about 0.25 V to about 0.75 V. Moreover, in the second interval B1, the voltage Vb may be about 1.5 V to about 2.5 V. When a voltage between about 0 V and about 2.5 V is applied to a pixel, liquid crystal corresponding to the pixel is in a black state.

According to exemplary Embodiment 1, the liquid crystal layer 300 (FIG. 3) may be in both a white state and the black state during the first frame interval F1.

The liquid crystal layer 300 may be in the white state during the first interval A1, and the liquid crystal layer 300 may be in the black state during the second interval B1.

When the liquid crystal layer 300 is in the white state and the black stage alternately, the blurring of the moving images displayed on the display apparatus may be advantageously reduced.

An observer may remember one image for a relatively long time when the display apparatus displays one image for a relatively long time, so that the observer may essentially view a previous image as an afterimage.

In the illustrated exemplary embodiment where the liquid crystal layer 300 is in the white state and the black stage alternately, the observer remembers the one image for a relatively short time and a black image is displayed instead of the user remembering the one image for a relatively long time, so that blurring of the moving images displayed on the display apparatus may be reduced by half.

Figure 7:
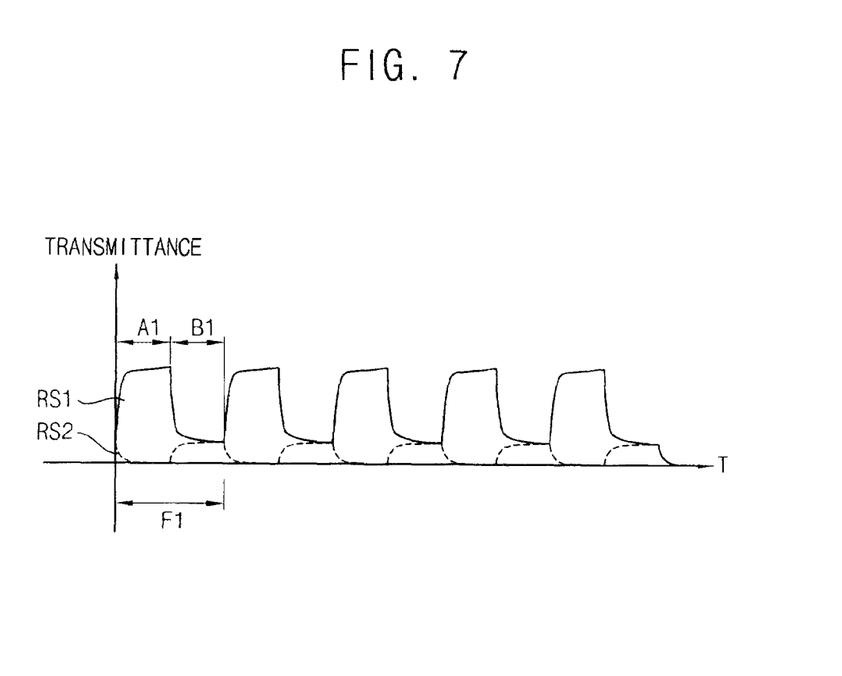
FIG. 7 is a waveform diagram showing an exemplary embodiment of liquid crystal response characteristics of the display apparatus of FIG. 1.

FIG. 7 is a waveform diagram showing an exemplary embodiment of liquid crystal response characteristics of the display apparatus of FIG. 1.

Referring to FIGS. 2, 6 and 7, a horizontal axis (x-axis) represents time T, and a vertical axis (y-axis) represents transmittance (%). The gate line GL1 operates at a frequency of about 120 Hz. Thus, the display apparatus may display the first frame for about 1/120 seconds. The first frame interval F1 in FIG. 7 represents 1/120 seconds. The dummy gate line DGL1 is separately driven from the gate line GL1. In one exemplary embodiment, the first dummy gate signal DGS 1 may be applied to the array substrate 100 the first interval A1 after driving the gate line GL1. The first interval A1 may be about 1/4 to about 3/4 times the first frame interval F1.

The dummy gate signal DGS1 turns on the dummy switching element ST13 so that the lower pixel electrode LP and the upper pixel electrode HP are electrically connected to share electric charges. The voltage Vb between the lower pixel electrode LP and the upper pixel electrode HP is applied to each of the lower and upper pixel electrodes LP and HP during the second interval B1.

A response waveform of the liquid crystal layer 300 may represent electric field power. The electric field power formed between the upper pixel electrode HP of the array substrate 100 and the lower pixel electrode LP of the opposite substrate 200 represents a first response waveform RS1. The electric field power formed between the lower pixel electrode LP of the array substrate 100 and the upper pixel electrode HP of the opposite substrate 200 represents a second response waveform RS2.

In the illustrated exemplary embodiment, the magnitude of the first response waveform RS1 may be greater than the magnitude of the second response waveform RS2 during the first interval A1. The magnitude of the first response waveform RS1 of the second interval B1 may be less than that of the first interval A1. The magnitude of the second response waveform RS2 of the second interval B1 is greater than that of the first interval A1.

A reduction range of the first response waveform RS1 between the first interval A1 and the second interval B1 is greater than a reduction range of the second response waveform RS2 between first interval A1 and the second interval B1. Since the first total capacitance is over two times greater than the second total capacitance, the voltage Vb is closer to the low voltage than the high voltage.

Figure 8:
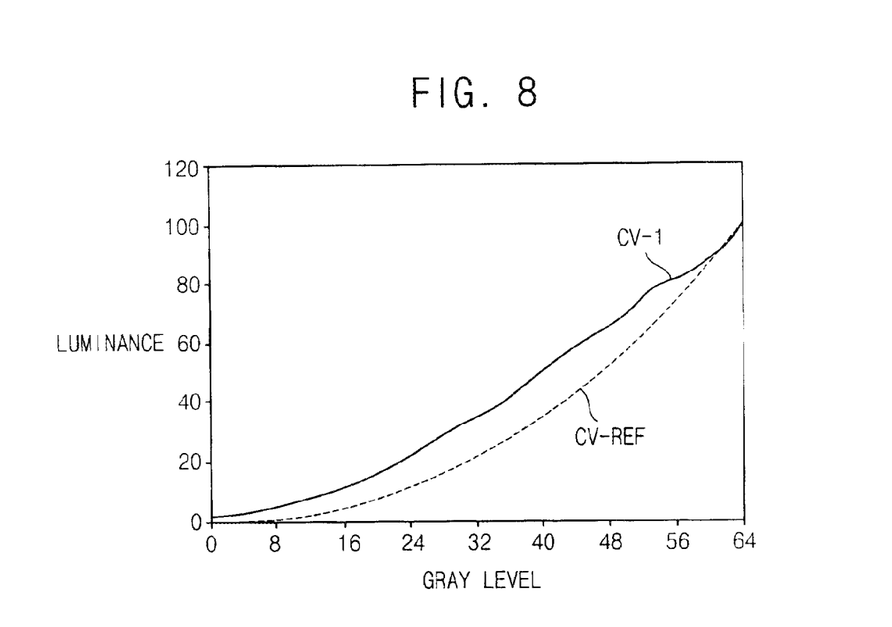
FIG. 8 is a graph showing an exemplary embodiment of an improvement of the side visibility of the display apparatus of FIG. 2.

FIG. 8 is a graph showing an exemplary embodiment of improvement of the side visibility of the display apparatus of FIG. 2.

Referring to FIGS. 2 and 8, a horizontal axis (x-axis) represents gray levels of an image (for example, 64 gray levels), and a vertical axis (y-axis) represents luminance (or transmittance). A first gamma curve CV-1 is a curve of luminance versus gray levels measured at the display apparatus according to exemplary Embodiment 1. A reference curve CV-REF is a gamma curve when front visibility is optimized.

As shown in FIG. 8, the luminance of the first gamma curve CV-1 rises stably (e.g., essentially constantly) according to a rise of the gray level. Moreover, a portion of the first gamma curve CV-1, of which the gray level is less than about 20, is closer to the reference curve CV-REF than a portion of the first gamma curve CV1, of which the gray level is greater than or equal to about 20. Advantageously, it can be seen that the side visibility of the display apparatus according to exemplary Embodiment 1 is improved at low gray levels.

In the illustrated embodiment, the display apparatus may use a time division method by forming the dummy gate line DGL1 which spatially divides the lower pixel electrode LP and the upper pixel electrode HP, so that the number of domains of the pixel may be increased. Advantageously, the side visibility of the display apparatus may be improved.

In the exemplary Embodiment 1, the dummy gate line is disposed without increasing the number of data lines, so that the unit pixel may be driven by essentially two gate lines and two data lines. Advantageously, image quality may be enhanced and the side visibility of the display apparatus may be improved.

Exemplary Embodiment 2

Figure 9:
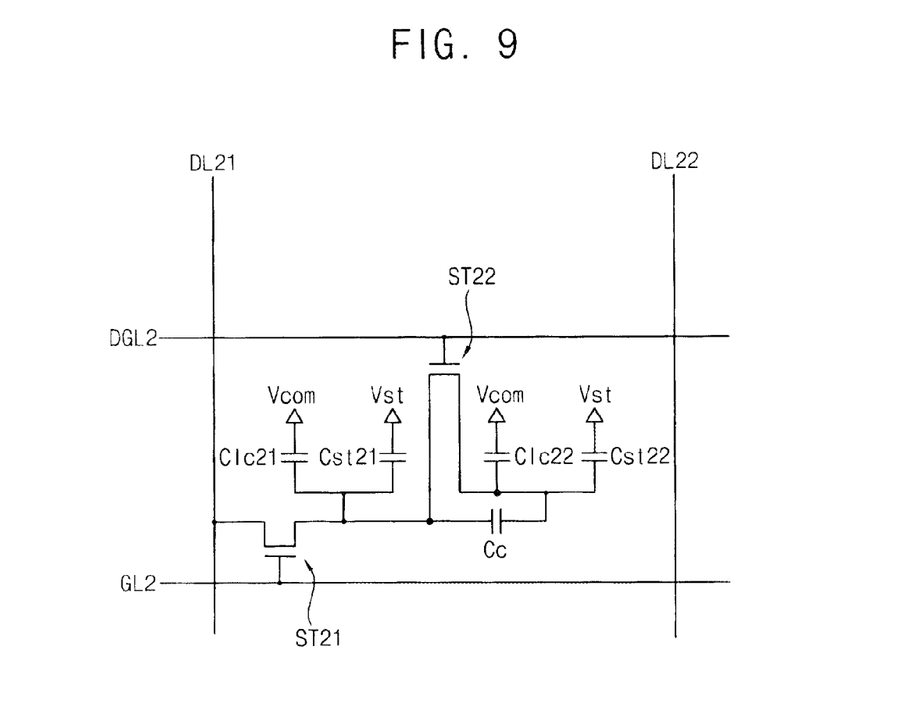
FIG. 9 is an equivalent circuit diagram illustrating a display apparatus according to Embodiment 2 of the present invention.

FIG. 9 is an equivalent circuit diagram illustrating a display apparatus according to Embodiment 2 of the present invention.

A panel driving part driving a display panel according to Embodiment 2 is substantially the same as the panel driving part according to Embodiment 1 except for the data driving part. Thus, the same reference numbers are used for the same elements, and repetitive descriptions will be omitted.

The data driving part according to Embodiment 1 applies the high voltage and the low voltage to the first and second data lines DL11 and DL12. However, the data driving part according to Embodiment 2 applies only the high voltage to a first data line DL21.

Referring to FIGS. 4 and 9, a dummy gate line DGL2 is disposed adjacent to a gate line GL2. A first data line DL21 and a second data line DL22 are disposed crossing both the dummy gate line DGL2 and the gate line GL2.

A gate electrode of a first switching element ST21 is electrically connected to the gate line GL2. A source electrode of the first switching element ST21 is electrically connected to the first data line DL21. A drain electrode of a first switching element ST21 is electrically connected to a first electrode of a first liquid crystal capacitor Clc21, a first electrode of a first storage capacitor Cst21 and a first electrode of a coupling capacitor Cc.

A second electrode of the coupling capacitor Cc is electrically connected to a first electrode of a second liquid crystal capacitor Clc22 and a first electrode of a second storage capacitor Cst22.

The first electrode of the first liquid crystal capacitor Clc21 and the first electrode of the first storage capacitor Cst21 are upper pixel electrodes. A second electrode of the first liquid crystal capacitor Clc21 is connected to the common electrode 240 to receive a common voltage Vcom, and a second electrode of the first storage capacitor Cst21 is connected to a storage line (not shown) to receive a storage voltage Vst.

Additionally, the first electrode of the second liquid crystal capacitor Clc22 and the first electrode of the second storage capacitor Cst22 are upper pixel electrodes. A second electrode of the second liquid crystal capacitor Clc22 is connected to the common electrode 240 to receive the common voltage Vcom, and a second electrode of the second storage capacitor Cst22 is connected to the storage line (not shown) to receive the storage voltage Vst.

A gate electrode of a dummy switching element ST22 is electrically connected to the dummy gate line DGL2. A source electrode of the dummy switching element ST22 is electrically connected to the drain electrode of the first switching electrode ST21 and a drain electrode of the dummy switching element ST22 is electrically connected to a second electrode of the coupling capacitor Cc.

The first liquid crystal capacitor Clc21 and the second liquid crystal capacitor Clc22 may share electric charges according to a dummy gate signal applied to the dummy gate line DGL2.

Specifically, when a gate signal is applied to the gate line GL2, the first liquid crystal capacitor Clc21 may be charged with the low voltage and the second liquid crystal capacitor Clc22 may be charged with the high voltage during a first interval of a frame.

When the dummy gate signal is applied to the dummy gate line DGL2, the first liquid crystal capacitor Clc21 and the second liquid crystal capacitor Clc22 are charged with a voltage which is between the low voltage and the high voltage during a second interval of the frame.

Advantageously, the display apparatus may use a time division method by forming the dummy gate line DGL2 which divides the lower pixel electrode and the upper pixel electrode spatially, so that the number of domains of the pixel may be increased.

In the exemplary Embodiment 2, the side visibility of the display apparatus may be improved. Additionally, the dummy gate line is disposed without increasing the number of data lines so that the unit pixel may be driven by essentially two gate lines and one data line. Advantageously, image quality may be enhanced and the side visibility of the display apparatus may be improved.

Exemplary Embodiment 3

Figure 10:
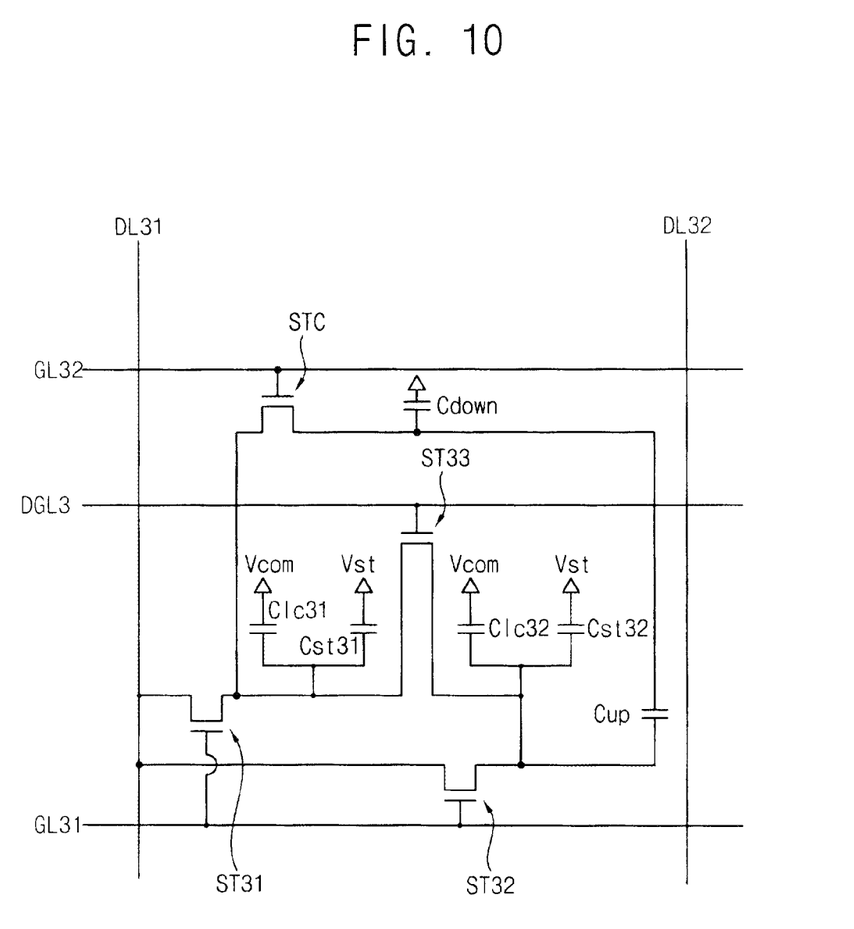
FIG. 10 is an equivalent circuit diagram illustrating a display apparatus according to Embodiment 3 of the present invention.

FIG. 10 is an equivalent circuit diagram illustrating a display apparatus according to Embodiment 3 of the present invention.

A panel driving part driving a display panel according to Embodiment 3 is substantially the same as the panel driving part according to Embodiment 1 except for the data driving part and the gate driving part. Thus, the same reference numbers are used for the same elements, and repetitive descriptions are omitted.

The data driving part according to Embodiment 1 applies the high voltage and the low voltage to the first and second data lines DL11 and DL12. However, the data driving part according to Embodiment 3 applies only the high voltage to a first data line DL31.

Additionally, the gate driving part according to Embodiment 1 applies the gate signal to the gate line GL1 to drive a unit pixel. However, the gate driving part according to Embodiment 3 applies a gate signal and a connection gate signal to a gate line D31 and a connection gate line GL32 to drive the unit pixel.

Referring to FIG. 10, a dummy gate line DGL3 is disposed between the gate line GL31 and the connection gate line GL32. The gate line GL31, the connection gate line GL32 and the dummy gate line DGL3 are disposed crossing both the first data line DL31 and a second data line DL32.

A gate electrode of a first switching element ST31 is electrically connected to the gate line GL31. A source electrode of the first switching element ST31 is electrically connected to the first data line DL31. A gate electrode of a second switching element ST32 is electrically connected to the (same) gate line GL31. A source electrode of the second switching element ST32 is electrically connected to the (same) first data line DL31.

A drain electrode of the first switching element ST31 is electrically connected to a first electrode of a first liquid crystal capacitor Clc31, a first electrode of a first storage capacitor Cst31 and a source electrode of a connection switching element STC.

A drain electrode of the second switching element ST32 is electrically connected to a first electrode of a second liquid crystal capacitor Clc32, a first electrode of a second storage capacitor Cst32 and a first electrode of an up-voltage capacitor Cup.

A gate electrode of the connection switching element STC is electrically connected to the connection gate line GL32, a drain electrode of the connection switching element STC is electrically connected to a second electrode of the up-voltage capacitor Cup and a first electrode of a down-voltage capacitor Cdown.

In the illustrated embodiment, the up-voltage capacitor Cup and the down-voltage capacitor Cdown may be defined as coupling capacitors. The first electrodes of the first liquid crystal capacitor Clc31 and the first storage capacitor Cst31 are lower pixel electrodes. A second electrode of the first liquid crystal capacitor Clc31 is connected to the common electrode 240 to receive a common voltage Vcom, and a second electrode of the first storage capacitor Cst31 is connected to a storage line (not shown) to receive a storage voltage Vst.

Additionally, the first electrode of the second liquid crystal capacitor Clc32 and the first electrode of the second storage capacitor Cst32 are upper pixel electrodes. A second electrode of the second liquid crystal capacitor Clc32 is connected to the common electrode 240 to receive the common voltage Vcom, and a second electrode of the second storage capacitor Cst32 is connected to the storage line (not shown) to receive the storage voltage Vst.

A gate electrode of a dummy switching element ST33 is electrically connected to the dummy gate line DGL3. A source electrode of the dummy switching element ST33 is electrically connected to the drain electrode of the first switching electrode ST31 and a drain electrode of the dummy switching element ST33 is electrically connected to the drain electrode of the second switching element ST32.

The first liquid crystal capacitor Clc31 and the second liquid crystal capacitor Clc32 may share electric charges according to a dummy gate signal applied to the dummy gate line DGL3.

When a gate signal is applied to the gate line GL31, the first liquid crystal capacitor Clc31 may be charged with the low voltage and the second liquid crystal capacitor Clc32 may be charged with the high voltage during a first interval of a frame.

When the dummy gate signal is applied to the dummy gate line DGL3, the first liquid crystal capacitor Clc31 and the second liquid crystal capacitor Clc32 are charged with a voltage which is between the low voltage and the high voltage during a second interval of the frame.

Advantageously, the display apparatus may use a time division method by forming the dummy gate line DGL3 which divides the lower pixel electrode and the upper pixel electrode spatially so that the number of domains of the pixel may be increased.

In the exemplary Embodiment 3, the side visibility of the display apparatus may be improved. Additionally, the dummy gate line is disposed without increasing the number of data lines so that a unit pixel may be driven by essentially three gate lines and one data line. Advantageously, image quality may be enhanced and the side visibility of the display apparatus may be improved.

As described above, according to exemplary embodiments of the present invention, a display apparatus may use a time division method by disposing a dummy gate line, which divides a lower pixel electrode and an upper pixel electrode spatially, so that the number of domains of a unit pixel may be increased. Advantageously, the side visibility of the display apparatus may be improved and blurring of moving images may be prevented.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display panel comprising:
   a common electrode;
   a first liquid crystal capacitor, a first electrode of the first liquid crystal capacitor being connected to the common electrode;
   a second liquid crystal capacitor, a first electrode of the second liquid crystal capacitor being the common electrode;
   a dummy gate line extending in a first direction;
   a dummy switching element having only three terminals in which a first terminal is electrically connected to a second electrode of the first liquid crystal capacitor, a second terminal electrically connected to a second electrode of the second liquid crystal capacitor and a third terminal of the three terminals is electrically connected to the dummy gate line;
   a first data line extending in a second direction and disposed crossing the dummy gate line;
   a gate line extending in the first direction and disposed adjacent to the dummy gate line,
   a coupling capacitor electrically connected between the second electrode of the first liquid crystal capacitor and the second electrode of the second liquid crystal capacitor; and
   a first switching element electrically connected to the first data line, the gate line, and the second electrode of the first liquid crystal capacitor.

2. The display panel of claim 1, wherein the display panel further comprises:
   a connection gate line extending in the first direction and disposed adjacent to the dummy gate line and opposing the gate line with respect to the dummy gate line;
   a first switching element electrically connected to the first data line, the gate line, and the second electrode of the first liquid crystal capacitor;
   a second switching element electrically connected to the first data line, the gate line, and the second electrode of the second liquid crystal capacitor;
   a dummy switching element electrically connected to the second electrode of the first liquid crystal capacitor, the dummy gate line, and the second electrode of the second liquid crystal capacitor;
   an up-capacitor comprising a first electrode electrically connected to the second switching element; and
   a connection switching element electrically connected to the second electrode of the first liquid crystal capacitor, the connection gate line, and a second electrode of the up-capacitor.

3. A method of driving a display panel comprising a first liquid crystal capacitor and a second liquid crystal capacitor, the method comprising:
   charging a first voltage in the first liquid crystal capacitor and a second voltage which is different from the first voltage in the second liquid crystal capacitor, during a first interval of a frame; and
   charging a voltage between the first voltage and the second voltage in the first and second liquid crystal capacitors, during a second interval of the frame after the first interval of the frame, wherein the display panel further comprises:
   a common electrode, the common electrode being connected to a first electrode of the first liquid crystal capacitor and a first electrode of the second liquid crystal capacitor;
   a first switching element electrically connected to a first data line, a gate line and a second electrode of the first liquid crystal capacitor;
   a coupling capacitor electrically connected between the second electrode of the first liquid crystal capacitor and a second electrode of the second liquid crystal capacitor; and
   a dummy switching element having only three terminals in which a first terminal is electrically connected to a dummy gate line, a second terminal is electrically connected to the second electrode of the first liquid crystal capacitor and a third terminal of the three terminals is electrically connected to the second electrode of the second liquid crystal capacitor.

4. The method of claim 3, wherein a gate signal is applied to the gate line and a first data voltage is applied to the first data line, in the first interval of the frame.

5. The method of claim 3, wherein the display panel further comprises:
   the common electrode being connected to the first electrode of the first liquid crystal capacitor and the first electrode of the second liquid crystal capacitor;
   the first switching element electrically connected to the first data line, the gate line and the second electrode of the first liquid crystal capacitor;
   a second switching element electrically connected to the first data line, the gate line and the second electrode of the second liquid crystal capacitor;
   the dummy switching element electrically connected to the second electrode of the first liquid crystal capacitor, the dummy gate line and the second electrode of the second liquid crystal capacitor;
   an up-capacitor comprising a first electrode electrically connected to the second switching element; and
   a connection switching element electrically connected to the second electrode of the first liquid crystal capacitor, a connection gate line and a second electrode of the up-capacitor.

6. The method of claim 5, wherein a gate signal is applied to the gate line, and a first data voltage is applied to the first data line, in the first interval of the frame.

7. A display apparatus comprising:
a display panel comprising a first liquid crystal capacitor and a second liquid crystal capacitor; and
a panel driving part charging a first voltage in the first liquid crystal capacitor and a second voltage different from the first voltage in the second liquid crystal capacitor, during a first interval of a frame, and charging a voltage substantially having a level between the first voltage and the second voltage to both the first and second liquid crystal capacitors, during a second interval of the frame, wherein the display panel further comprises:
a first data line;
a gate line crossing the first data line to receive a gate signal which starts the first interval; and
a dummy gate line adjacent to the gate line and receiving a dummy gate signal that starts the second interval, wherein the display panel further comprises:
a common electrode, the common electrode being connected to a first electrode of the first liquid crystal capacitor and a first electrode of the second liquid crystal capacitor;
a first switching element electrically connected to the first data line, the gate line and a second electrode of the first liquid crystal capacitor;
a coupling capacitor electrically connected between the second electrode of the first liquid crystal capacitor and a second electrode of the second liquid crystal capacitor; and
a dummy switching element having only three terminals in which a first terminal is electrically connected to the dummy gate line, a second terminal is electrically connected to the second electrode of the first liquid crystal capacitor and a third terminal of the three terminals is electrically connected to the second electrode of the second liquid crystal capacitor.

8. The display apparatus of claim 7, wherein the display panel further comprises:
the common electrode being connected to a first electrode of the first liquid crystal capacitor and a first electrode of the second liquid crystal capacitor;
the first switching element electrically connected to the first data line, the gate line and the second electrode of the first liquid crystal capacitor;
the second switching element electrically connected to the first data line, the gate line and the second electrode of the second liquid crystal capacitor;
the dummy switching element electrically connected to the second electrode of the first liquid crystal capacitor, the dummy gate line and the second electrode of the second liquid crystal capacitor;
an up-capacitor including a first electrode electrically connected to the second switching element; and
a connection switching element electrically connected to the second electrode of the first liquid crystal capacitor, a connection gate line and a second electrode of the up-capacitor.

* * * * *